United States Patent [19]

Mandellos et al.

[11] Patent Number: 4,807,090
[45] Date of Patent: Feb. 21, 1989

[54] INSTRUMENT ILLUMINATION SYSTEM

[75] Inventors: Panagiotis K. Mandellos, Skokie; Renzo N. Rutili, Evanston, both of Ill.

[73] Assignee: Stewart Warner Corporation, Chicago, Ill.

[21] Appl. No.: 153,499

[22] Filed: Feb. 11, 1988

Related U.S. Application Data

[63] Continuation of Ser. No. 939,358, Dec. 8, 1986, abandoned.

[51] Int. Cl.$^4$ ............................................. G01D 11/28
[52] U.S. Cl. ....................................... 362/26; 362/30; 116/287; 116/DIG. 5
[58] Field of Search ...................... 362/23, 26, 28, 29, 362/30, 31; 116/286, 287, 288, DIG. 5, DIG. 36

[56] References Cited

U.S. PATENT DOCUMENTS

| 2,606,277 | 8/1952 | Triplett | 362/26 |
| 2,837,052 | 6/1958 | Viret | 362/29 |
| 3,257,748 | 6/1966 | Hardesty | 362/20 |
| 4,004,546 | 1/1977 | Harland | 116/288 |
| 4,581,683 | 9/1986 | Reiter et al. | 362/23 |

FOREIGN PATENT DOCUMENTS 1070767  2/1954  France ................................ 362/30

Primary Examiner—Samuel Scott
Assistant Examiner—Noah Kamen
Attorney, Agent, or Firm—Lorusso & Loud

[57] ABSTRACT

An instrument with an illumination ring that edge-lights an opaque dial face with increased light flow by augmenting the conductivity of both the light receiving portion of the ring and a bevel for deflecting light laterally across the face. The increased light flow is accomplished by an extended annular wall portion spaced from the edge of the dial face.

10 Claims, 2 Drawing Sheets

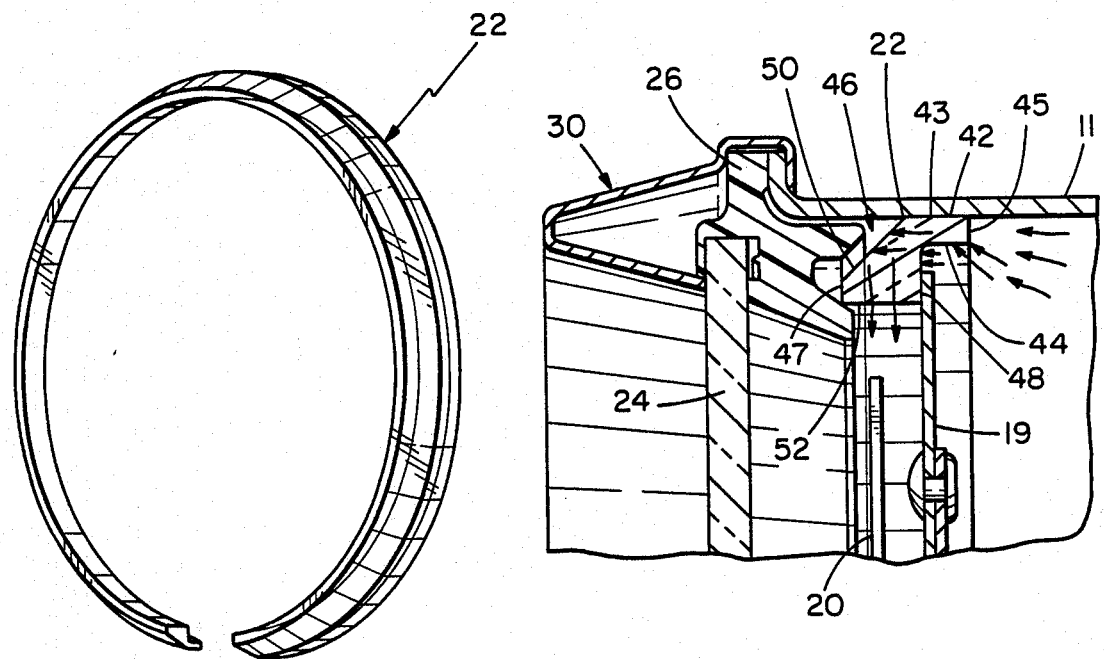
FIG. 4
FIG. 6
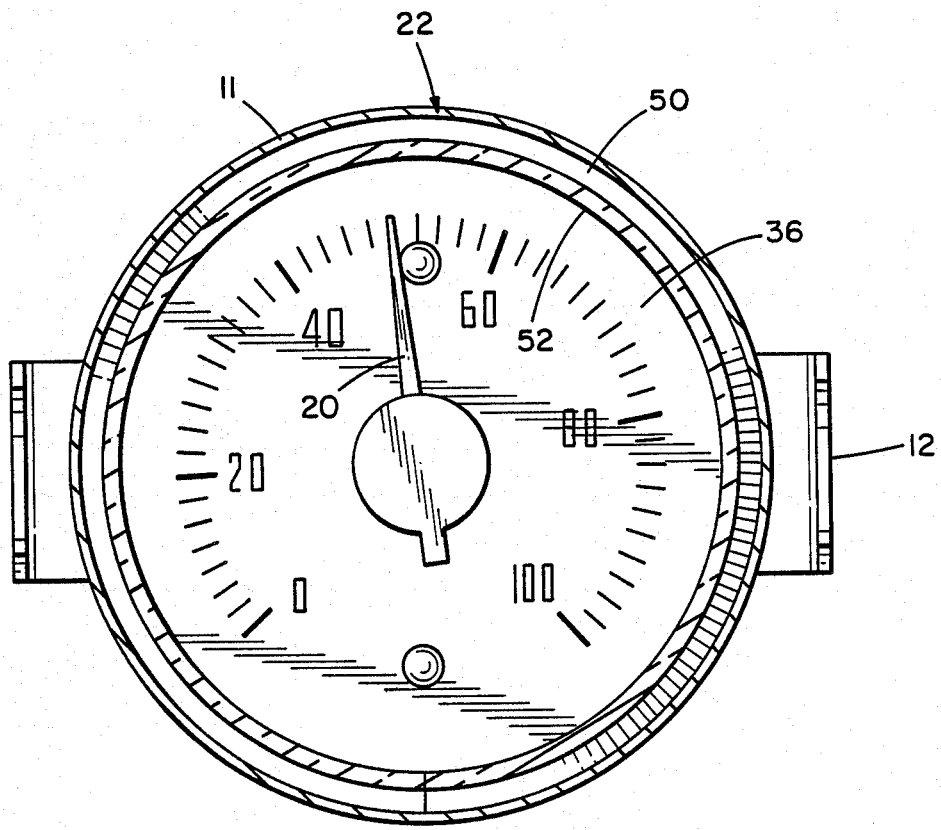
FIG. 5

INSTRUMENT ILLUMINATION SYSTEM

This is a continuation of co-pending application Ser. No. 939,358 filed on Dec. 8, 1986, now abandoned.

BACKGROUND OF THE INVENTION

Edge lighting techniques for illuminating dials, indicators and instrument face plates have become increasingly popular over the last decade because they offer opportunities to mask the light source from the viewer or operator and also flexibility in positioning the light source, and if properly utilized, can defuse and spread light evenly over the surface to be illuminated.

A variety of techniques have been used in edge lighting systems to achieve these ends. Edge lighting is basically the utilization of a transparent plastic conductor that acts as an optical receptor for receiving light from a source, and an optical emitter for directing light within the conductor in some coherent manner across the surface or area to be illuminated.

One technique for increasing the receptability of the conductor to light is to provide an enlarged isosceles triangular section on the conductor adjacent the light source. Another is to mount the light source in a circular aperture in the conductor and to apply white paint to the periphery of the conductor. Still another technique is to provide a forty-five degree bevel along one or more edges of the conductor, with the bevel painted white, and to mount a backplate with a background color directly behind the conductor, with a bezel covering the bevel and the light source positioned directly behind the beveled surface. This bevel acts to direct light ninety degrees from the source through the transparent conductor illuminating the rearwardly mounted background color.

Where the space for a lamp is limited beyond the periphery of the piece, this forty-five degree facet cut along the edge permits lamp location behind the edge rather than beyond it. However, bezels and masks must be used to block unwanted stray light. Sometimes white paint or metallizing on the forty-five degree facet improves performance by reflecting rays striking the bevel at less than the critical angle for total reflection.

The local destruction of polished surfaces on the conductor, such as by frosting, sandblasting, scratching or honing will cause light rays to scatter as they strike that zone. A few rays will pass through the frosted zone and produce a glow but most will scatter diffusely back across the thickness of the conductor and many will emerge or emit from the opposite surface to be viewed as an illuminated marking.

Where dark backgrounds are desired, a second opaque part is sometimes used behind the rear surface of the conductor. It may be almost in contact with the conductor, but a thin film of air desirably remains between it and the edge lighted panel to preserve the air interface for internal reflectivity.

As an alternative to utilizing a beveled surface to deflect light from a rearwardly positioned light source, it is also known to use a constant thickness curved conductor for the same purpose.

One specific conductor for edge lighting instruments is an annular illumination ring that extends about the periphery of a dial face to be illuminated. It has a light receiving flat radial surface adjacent the light source and an outer forty-five degree beveled surface that extends axially from one end of the ring the other. The light receiving portion also serves to center the dial face to be illuminated because the ring is not radially expandable. Since the light receiving portion of the ring is a single flat radial surface, its light receiving capabilities are relatively low. And the light transmitting capability of the ring is limited because the bevel directs light laterally in the light receiving portion of the ring where it is ineffective to illuminate the face of the dial.

Because of the limited light conducting capabilities of this ring, it is necessary in this illumination system to make the dial face itself translucent so that light passes directly through the dial to assist in illuminating the dial face. The problem is that the opaque areas on the dial face cause the dial face to be illuminated unevenly with many dark spots. Such an illuminated instrument is manufactured by U. S. Gauge Company.

It is a primary object of the present invention to ameliorate the problems discussed above in illuminating instrument indicating panels by edge lighting.

SUMMARY OF THE PRESENT INVENTION

In accordance with the present invention an instrument with an illumination ring is provided that edge lights an opaque dial face with increased light flow by augmenting the conductivity of the light ring with an annular light receiving portion spaced from the dial face and a forward deflecting portion with a beveled wall positioned to deflect essentially one hundred percent of its received light to the dial face.

Toward these ends, the present illumination ring is a transparent and sometimes colored annular ring that is split and biased outwardly into engagement with an inner surface of an instrument housing. This biasing separates part of the illumination ring from the opaque dial indicator to increase the reception of light into the ring. In prior designs the indicator dial or plate was centered by the illumination ring reducing the light reception characteristics of the ring. The present illumination ring also has a radially inwardly directed forward portion with a beveled outer surface that is radially positioned to direct substantially one hundred percent of the light from the receiving portion of the ring ninety degrees across the face of the indicator dial or plate.

A further feature of the present invention is the increased axial length of the beveled deflecting wall in the ring that increases the light emitting characteristic of the illumination ring.

The combination of increased light reception in the annular receiving portion of the illumination ring, the radial positioning of the beveled light deflecting wall to deflect all of the light impinging on the wall to the indicator dial or plate, and the increased axial length of the beveled wall to enhance the light emitting function of the ring, together eliminate the requirement for additional or supplementary mechanical elements for lighting the dial face found necessary in prior art instrument illumination rings.

A further feature of the present invention is the color tinting in the plastic illumination ring eliminating the requirement for colored source lighting which has quality control problems.

Further objects and advantages of the present invention will become apparent from the detailed description of the invention.

BRIEF DESCRIPTION OF THE DRAWINGS

FIG. 4 is a perspective sub-assembly of the illumination ring illustrated in FIG. 3;

FIG. 5 is a cross-section taken generally along line 5—5 of FIG. 3 showing the illumination ring; and FIG. 6 is an enlarged fragmentary view of the light ring generally the same as illustrated in FIG. 3 with directional arrows indicating the direction of light entering the illumination ring.

DETAILED DESCRIPTION OF THE PREFERRED EMBODIMENT

Figure 1:
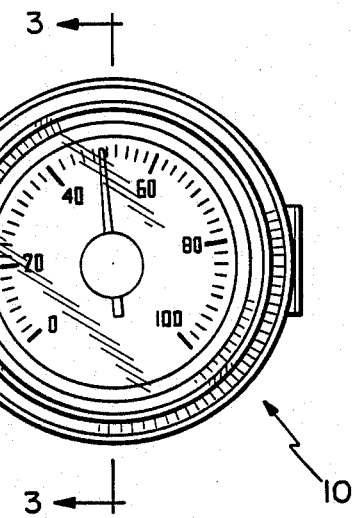
FIG. 1 is a front view of an instrument with an illumination ring according to the present invention.
Figure 2:
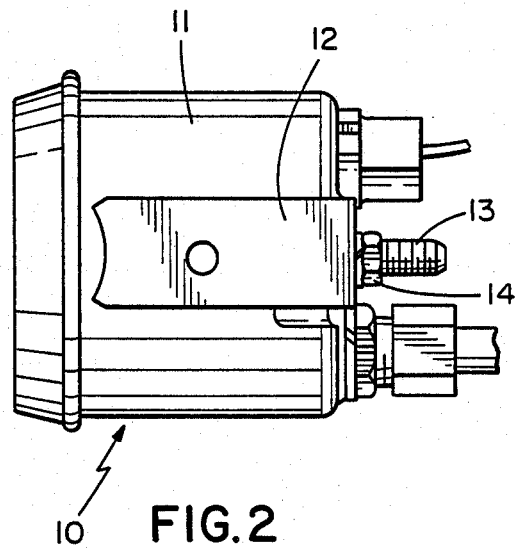
FIG. 2 is a side-view of the instrument illustrated in FIG. 1.

Referred to the drawings, an instrument 10 is illustrated as a pressure gauge but it should be understood that the illumination principles of the present invention could be applied to other indicating devices such as tachometers, speedometers, temperature gauges, etc. The pressure gauge 10 is seen to generally include a cup-shaped housing member 11, a dashboard-type U-shaped mounting bracket 12 adjustably held in position by a threaded fastener 13 and nut 14, an enclosed instrument movement or circuit 16 mounted within the housing 11 that receives transduced signals representing pressure at input 18 at the rear of the housing 12, dial indicator plate 19, pointer 20 driven by instrument movement 16, illumination ring 22 for directing light transversely across the face of dial plate 19 from a light bulb assembly 23 mounted in the rear of housing 11, and a forward glass 24.

The cup-shaped housing 11 has a forward flange 25 that is clamped against a radially outwardly extending flange 26 on an elastomeric glass holder 27 by forward bezel 30 that has a roll staked portion 31 around flange 25 and flange 26.

The glass holder 27 has a recess 29 that receives and holds glass 24 in position and the bezel 30 has a frusto-conical inner wall 33 that covers the glass holder 27 from view from the front of the instrument 10.

The dial indicator plate 19 is attached to flange 36 on movement shield 37 by rivets. The plate 19 has a forward surface on which indicia are placed. An important aspect of the present invention is that the dial indicator plate 19 is opaque so that no light is transmitted from light source 23 through the dial indicator plate 19 and all of the light directed to the forward face of dial plate 19 is transmitted by light ring 22.

Figure 3:
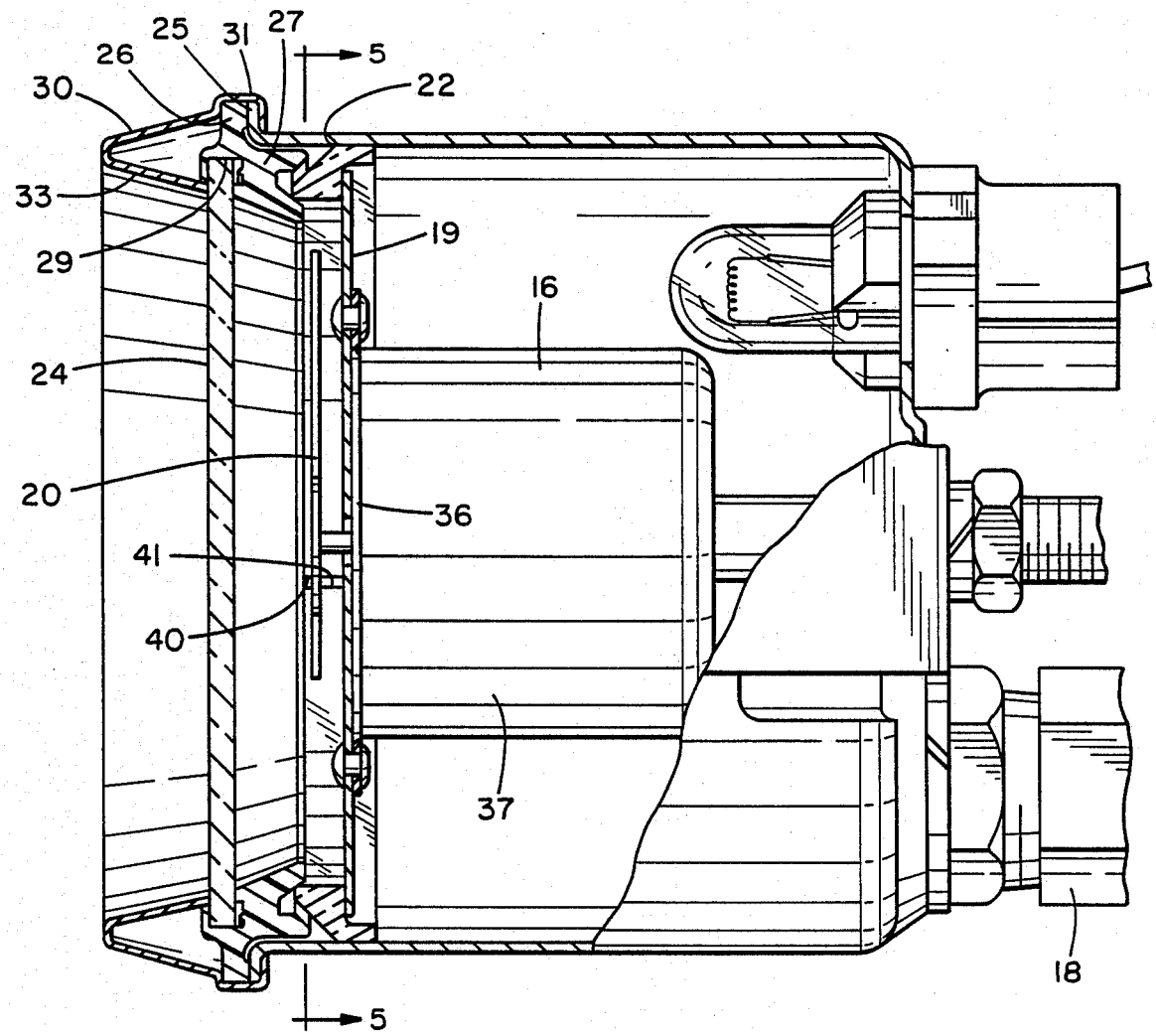
FIG. 3 is an enlarged fragmentary longitudinal section taken generally along line 3—3 of FIG. 1.

As seen in FIGS. 3 and 4, light ring 22 is constructed of transparent plastic and is tinted with an appropriate color so that bulb 38 in light assembly 23 need not be a colored bulb. Many of the acrylic plastics have been found suitable for light ring 22.

Light ring 22 is axially located in the housing 11 by the glass holder 27 and is biased in a radially outward direction into frictional engagement with the interior wall of housing 11 because the ring is split. In this way ring 22 is mounted in housing 11 independently of and spaced from the indicator plate assembly 19.

As seen in FIGS. 4, 5 and 6, the light ring 22 has an annular peripheral light receiving portion 42 having an outer annular wall 43, an inner annular wall 44 and a radial rear wall 45. Integrally formed with peripheral portion 42 is a forward inwardly directed ring portion 46 having a short radial forward wall 47, a radial rear wall 48 and an interconnecting forty-five degree bevel or frusto-conical wall 50. Wall 50 is a light deflecting wall and may have a coating of white paint thereon to increase its light-deflecting characteristics.

As seen in FIG. 6, the inner wall 44 of peripheral light receiving ring portion 42 is spaced radially outwardly from the outer edge of the indicator plate assembly 19 so that light may pass into ring 22 directly through three surfaces, namely radial surface 45, the inner wall 44 and the outer portion of radial wall 48, thereby multiplying the light receiving area of ring 42 and increasing its light transmitting capacity.

An important aspect of the present invention is the location and positioning of frusto-conical or beveled wall 50, and as seen in FIG. 6, wall 50 is firstly axially aligned with the light receiving portions of wall 45 and wall 48 so that light traveling through these walls is directed almost entirely at beveled wall 50. Furthermore, beveled wall 50 is substantially radially aligned with and equal in axial length to annular wall 52 which defines the light emitting wall for the light ring or conductor 22. In this way almost one hundred percent of the light entering the ring 22 impinges against beveled wall 50 and of that impinging light, substantially all deflected light passes outwardly through wall 52 across forward dial plate 36.

A further important feature of the present invention is the axial length of the light emitting wall 52. The light emitting wall 52 is more than three times the length of the forward radial wall 47, further increasing the light emitting capacity of the ring conductor 22 over prior known edge lighting devices.

The ring 22 as seen from the above description provides increased light conductivity over prior edge lighting conductors and provides uniform and sufficient illumination for the indicator plate 36 so that instrument 10 does not require any further or supplementary dial illumination.

We claim:

1. An illuminated instrument comprising: a housing, an instrument movement mounted in the housing, an opaque indicator member with a forward face mounted toward the front of the housing having a peripheral edge, a source of light in the housing positioned rearwardly of the indicator member, a transparent illumination ring surrounding the indicator member for directing light from the source around the edge of the indicator member to the forward face thereof including an annular peripheral portion having inner and outer annular surfaces, said inner annular surface being positioned to receive light directly from the source, and a radially inwardly directed portion connected to the peripheral portion having a flat radial rear surface joining the peripheral portion inner wall, a flat radial forward wall, and a beveled wall joining the peripheral portion outer wall and its forward wall, said inner wall of the peripheral portion being radially spaced from the peripheral edge of the indicator member so the rear surface of the radial portion of the ring receives light directly from the source and not through the peripheral portion of the ring to increase light flow through the ring, said indicator member being radially free of the illumination ring to permit easier assembly of the movement and ring, a substantial portion of the beveled wall being positioned radially inwardly of the peripheral portion of the ring.

2. An illuminated instrument as defined in claim 1, wherein the beveled wall on the illumination ring is positioned so that light flow axially through the ring is unobstructed across the radial width of the beveled wall.

3. An illuminated instrument as defined in claim 1, wherein the illumination ring inwardly directed portion has an inner annular wall having an axial length at least three times the radial width of the ring forward wall to increase light flow to the indicator member forward face.

4. An illuminated instrument as defined in claim 1, wherein the illumination ring is split and biased outwardly toward the housing, said indicator member being centered in the housing without the illumination ring whereby the edge of the indicator member is radially spaced from the peripheral portion of the illumination ring to increase light flow into the illumination ring.

5. An illuminated instrument comprising: a housing, an instrument movement mounted in the housing having an opaque indicator member with a forward face mounted toward the front of the housing having a peripheral edge, a source of light in the housing positioned rearwardly of the indicator member, a transparent illumination ring surrounding the member for directing light from the source around the edge of the indicator member to the forward face thereof including an annular peripheral portion having inner and outer annular surfaces, and a radially inwardly directed portion connected to the peripheral portion having a flat radial rear surface joining the peripheral portion inner wall, a flat radial forward wall, and a beveled wall joining the peripheral portion outer wall and its forward wall, said inner wall of the peripheral portion being radially spaced from the peripheral edge of the indicator member so the rear surface of the radial portion of the ring receives light directly from the source and not through the peripheral portion of the ring to increase light flow through the ring, said indicator member being radially free of the illumination ring to permit easier assembly of the movement and ring, said beveled wall being positioned so that a major portion thereof is radially inwardly of the peripheral portion of the ring to decrease light interference, said ring being split and biased outwardly so it is supported in the housing free of the indicator member.

6. An illuminated instrument as defined in claim 5, wherein the beveled wall on the illumination ring is positioned so that light flow axially through the ring is unobstructed across the radial width of the beveled wall.

7. An illuminated instrument as defined in claim 5, wherein the illumination ring inwardly directed portion has an inner annular wall having an axial length at least three times the radial width of the ring forward wall to increase light flow to the indicator member forward face.

8. An illuminated instrument comprising: a housing, an instrument movement mounted in the housing having an opaque indicator member with a forward face mounted toward the front of the housing having a peripheral edge, a source of light in the housing positioned rearwardly of the indicator member, a transparent illumination ring surrounding the indicator member for directing light from the source around the edge of the indicator member to the forward face thereof including an annular peripheral portion having inner and outer annular surfaces, and a radially inwardly directed portion connected to the peripheral portion having a flat radial rear surface joining the peripheral portion inner wall, a flat radial forward wall, and a beveled wall joining the peripheral portion outer wall and its forward wall, said inner wall of the peripheral portion being radially spaced from the peripheral edge of the indicator member so the rear surface of the radial portion of the ring receives light directly from the source and not through the peripheral portion of the ring to increase light flow through the ring, said indicator member being radially free of the illumination ring to permit easier assembly of the movement and ring, the illumination ring inwardly directed portion having an inner annular wall with an axial length at least three times the radial width of the ring forward wall to increase light flow to the indicator member forward face, said illumination ring being split and biased outwardly toward the housing, said indicator member being centered in the housing without the illumination ring.

9. An illuminated instrument comprising: a housing, an instrument movement mounted in the housing having an opaque indicator member with a forward face mounted toward the front of the housing having an opaque indicator member with a forward face mounted toward the front of the housing having a peripheral edge, a source of light in the housing positioned rearwardly of the indicator member, a tinted transparent illumination ring surrounding the indicator member for directing light from the source around the edge of the indicator member to the forward face thereof including an annular peripheral portion having inner and outer annular surfaces, and radially inwardly directed portion connected to the peripheral portion having a flat radial rear surface joining the peripheral portion inner wall, a flat radial forward radial wall and a beveled wall joining the peripheral portion outer wall and its forward wall, said radially inwardly directed portion having an inner annular wall having an axial length at least three times the radial width of the ring forward radial wall, said inner wall of the peripheral portion being radially spaced from the peripheral edge of the indicator member so the rear surface of the radial portion of the ring receives light directly from the source and not through the peripheral portion of the ring to increase light flow through the ring, said indicator member being radially free of the illumination ring to permit easier assembly of the movement and ring, said beveled wall being positioned so that major portion thereof is radially inwardly of the peripheral portion of the ring to decrease light interference, said ring being split and biased outwardly so it is supported in the housing free of the indicator member.

10. An illuminated instrument as defined in claim 9 wherein the beveled wall of the illumination ring is positioned so that light flow axially through the ring is unobstructed across the radial width of the beveled wall.

* * * * *